United States Patent
Hood et al.

(10) Patent No.: US 9,405,857 B2
(45) Date of Patent: *Aug. 2, 2016

(54) SPECULATIVE SEARCH RESULT ON A NOT-YET-SUBMITTED SEARCH QUERY

(71) Applicant: Jollify Management Limited, Road Town (VG)

(72) Inventors: Stephen L. Hood, Redwood City, CA (US); Ralph Rabbat, Palo Alto, CA (US); Mihir Shah, San Francisco, CA (US); Adam Durfee, Mountain View, CA (US); Alastair Gourlay, Boulder Creek, CA (US); Peter Anick, Malborough, MA (US); Richard Kasperski, Ceston (CA); Oliver Thomas Bayley, Pacifica, CA (US); Ashley Woodman Hall, Menlo Park, CA (US); Shyam Kapur, Sunnyvale, CA (US); John Thrall, San Francisco, CA (US)

(73) Assignee: Jollify Management Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,577

(22) Filed: Feb. 28, 2014

(65) Prior Publication Data

US 2014/0181069 A1  Jun. 26, 2014

Related U.S. Application Data

(63) Continuation of application No. 13/154,261, filed on Jun. 6, 2011, now Pat. No. 8,666,962, which is a continuation of application No. 12/703,756, filed on Feb. 10, 2010, now Pat. No. 7,958,110, which is a continuation of application No. 11/212,044, filed on Aug. 24, 2005, now Pat. No. 7,672,932.

(51) Int. Cl.
*G06F 17/30* (2006.01)

(52) U.S. Cl.
CPC ............ *G06F 17/3097* (2013.01); *G06F 17/30* (2013.01); *G06F 17/3064* (2013.01);
(Continued)

(58) Field of Classification Search
CPC ................... G06F 17/30905; G06F 17/30029; G06F 17/30548; G06F 17/30831; G06F 2201/81; G06F 17/3064; G06F 17/30864; G06F 17/30654; G06F 17/30657; G06F 17/30675; G06F 17/30672
See application file for complete search history.

(56) References Cited

U.S. PATENT DOCUMENTS 5,913,214 A * 6/1999 Madnick ........... G06F 17/30427
6,169,986 B1    1/2001 Bowman et al.
(Continued)

FOREIGN PATENT DOCUMENTS

JP        08255159       10/1996
JP      2001249933        9/2001
(Continued)

OTHER PUBLICATIONS

Mahlon R Waldorf, School of Computer Science, "An analysis of speculative search for asynchronous parallel alpha-beta search", Aug. 1999, pp. 1-89.*

(Continued)

*Primary Examiner* — Srirama Channavajjala

(57) ABSTRACT

Providing a speculative search result for a search query prior to completion of the search query is described. In response to receiving a search query from a client node, a speculative search result is provided to the client node for the search query prior to receiving an indication from the client node that said search query is completely formed. The speculative search result may be displayed on the same web page on the client node as the search query, while the search query is being entered by the user. As the user further enters the search query, a new speculative search result may be provided to the user.

19 Claims, 9 Drawing Sheets

(52) U.S. Cl.
CPC .... G06F17/30654 (2013.01); G06F 17/30657 (2013.01); G06F 17/30672 (2013.01); G06F 17/30675 (2013.01); G06F 17/30864 (2013.01); Y10S 707/99933 (2013.01)

(56) References Cited

U.S. PATENT DOCUMENTS

| | | | | |
|---|---|---|---|---|
| 6,564,213 | B1 * | 5/2003 | Ortega | G06F 17/3064 |
| 7,499,940 | B1 * | 3/2009 | Gibbs | G06F 17/30887 |
| 7,672,932 | B2 * | 3/2010 | Hood | G06F 17/30864 707/999.003 |
| 7,747,639 | B2 * | 6/2010 | Kasperski | G06F 17/30864 707/765 |
| 7,958,110 | B2 * | 6/2011 | Hood | G06F 17/30864 707/706 |
| 8,666,962 | B2 * | 3/2014 | Hood | G06F 17/30864 707/706 |
| 2002/0130899 | A1 * | 9/2002 | Ryan | G06Q 30/06 715/738 |
| 2002/0152204 | A1 | 10/2002 | Ortega et al. | |
| 2002/0194312 | A1 * | 12/2002 | Hino | 709/219 |
| 2003/0195877 | A1 * | 10/2003 | Ford | G06F 17/30705 |
| 2003/0220917 | A1 * | 11/2003 | Copperman | G06F 17/3064 |
| 2005/0125397 | A1 * | 6/2005 | Gross | G06F 17/30675 |
| 2007/0050351 | A1 * | 3/2007 | Kasperski | G06F 17/30864 |

FOREIGN PATENT DOCUMENTS

| | | |
|---|---|---|
| JP | 2004289848 | 10/2004 |
| JP | 2004334690 | 11/2004 |
| JP | 2005173984 | 6/2005 |
| KR | 10-0699977 | 3/2007 |
| WO | WO 2009/040574 * | 4/2009 |

OTHER PUBLICATIONS

Hayato Yamana, et al., "Fast speculative search engine on the highly parallel computer EM-X", SIGIR '98 Proceedings of the 21st annual international ACM SIGIR conference on Research and development in information retrieval, p. 390.*

KITS and others, "Fast full-text search system equipped with key completion function" Proceedings of the Association or Natural Language Processing 11th Annual Meeting, Japan. The Association for Natural Language Processing, Mar. 15, 2005 pp. 185-188.

* cited by examiner

SPECULATIVE SEARCH RESULT ON A NOT-YET-SUBMITTED SEARCH QUERY

CROSS REFERENCE TO RELATED CASES

This application is a continuation of U.S. patent application Ser. No. 13/154,261 filed Jun. 6, 2011, now U.S. Pat. No. 8,666,962, issued Mar. 4, 2014, which is a continuation of U.S. patent application Ser. No. 12/703,756 filed Feb. 10, 2010, now U.S. Pat. No. 7,958,110, issued Jun. 7, 2011, which is a continuation of U.S. patent application Ser. No. 11/212,044 filed Aug. 24, 2005, now U.S. Pat. No. 7,672,932, issued Mar. 2, 2010, which are incorporated herein by reference as if fully set forth herein, under 35 U.S.C. §120.

FIELD OF THE INVENTION

The present invention relates to search engines, and in particular, to providing a speculative search result prior to a search query being completely formed.

BACKGROUND OF THE INVENTION

A search engine is a computer program that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

The search engine typically has an interface allowing users to specify search criteria and an interface displaying the search results. Typically, the search engine orders the search results prior to presenting the search results interface to the user. The order usually takes the form of a "ranking," where the document with the highest ranking is the document considered most likely to satisfy the interest reflected in the search criteria specified by the user. The user is sent one (or more) search results pages based on the ranking. However, the user must still spend considerable time and effort processing the search results to determine whether the search query produced adequate search results. If the user is not satisfied with the results, the user forms a new search query and repeats the process.

Thus, the search process is often an iterative task in which the user forms a search query, determines whether the voluminous search results are adequate, and then re-formulates the search query, if needed. Therefore, the user experience with search engines is often frustrating and time consuming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
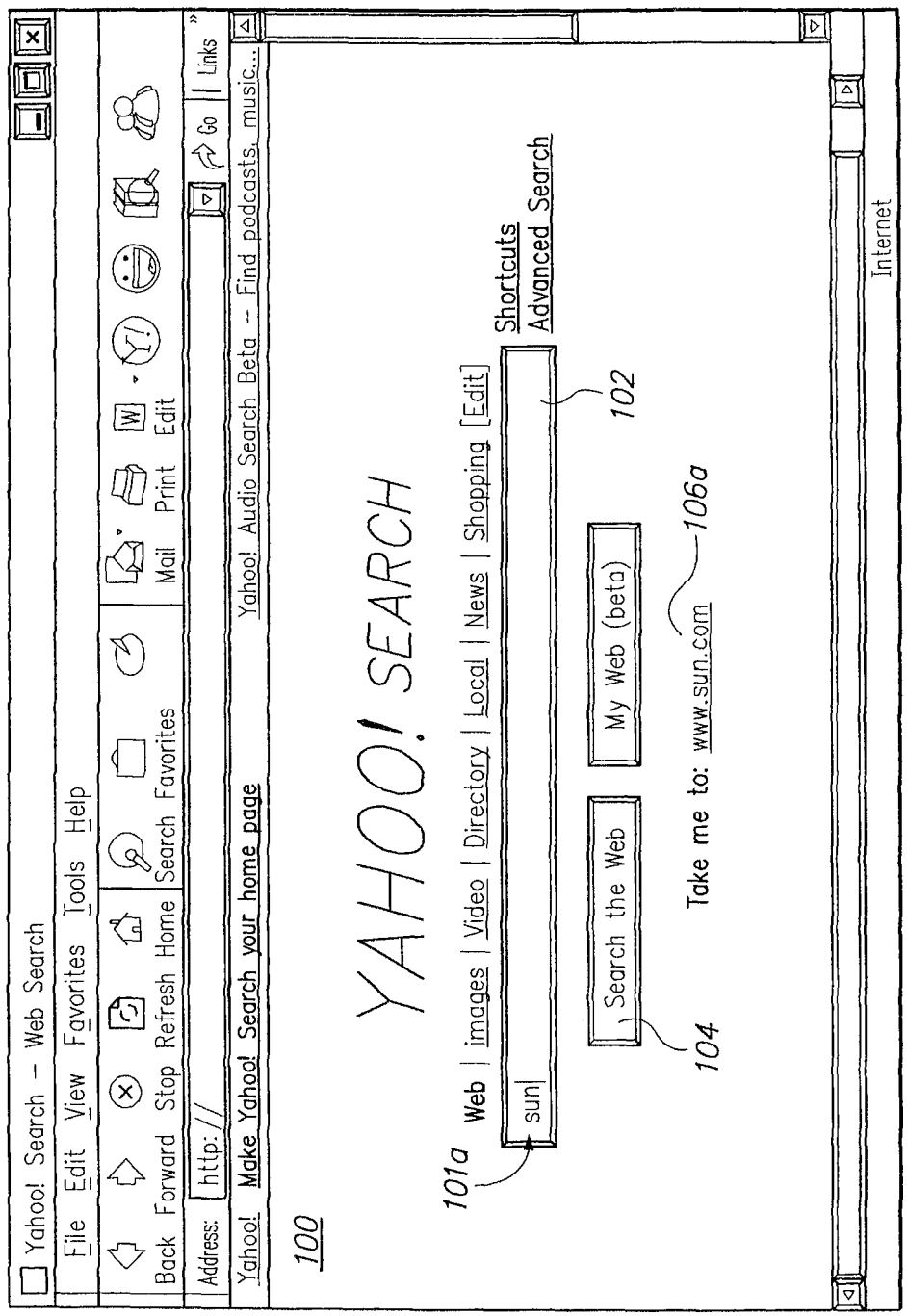
FIG. 1A, FIG. 1B, FIG. 1C, and FIG. 1D illustrate a graphical user interface for providing a speculative search result, according to an embodiment of the present invention.

A method and apparatus for providing a speculative search result to a search query is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Typically, when forming a search of the World Wide Web, or the like, a user will formulate a search query and then enter a carriage return, or click on a "search button", to initiate a search request based on the search query. The act that initiates the search request also serves to indicate that the search query has been "submitted". Prior to the act that initiates the search, the search query is "not-yet-submitted". Embodiments of the present invention perform a search and provide a speculative search result based on a not-yet-submitted search query prior to the user explicitly initiating the search request.

Techniques are described herein for providing a speculative search result for a search query prior to finalization of the search query. According to one embodiment, in response to receiving a not-yet-submitted search query from a client node, a speculative search result is provided to the client node for the not-yet-submitted search query prior to receiving an indication from the client node that said search query is completely formed. The speculative search result may be displayed on the same web page on the client node as the not-yet-submitted search query, while the search query is still being entered by the user. As the user continues to formulate the search query, a new speculative search result may be provided to the user.

The search request and search result may pertain to the World Wide Web; however, the techniques described herein are not so limited. More generally, the search request and result may pertain to any searchable data in any format. For example, the data may be a user's address book, saved links, personally stored images (such as .jpeg files, .gif files, etc.), video, audio (.mp3 files, .wmv files, etc.), contact cards (e.g., v-cards), calendar objects, word processing documents, graphics files, or computer code (object files and source code).

Speculative Search Initiation Criteria

To limit the frequency with which new speculative search results are provided during the entry of the search query, a determination may be made as to whether the not-yet-submitted search query meets criteria for initiating a search. Such criteria are referred to herein as "speculative search initiation criteria". The speculative search initiation criteria may be designed to limit the speculative search results to highly relevant results. For example, a criterion may be that the user has entered a complete word in the not-yet-submitted search query.

The speculative search initiation criteria can be used to ensure that the user is not inundated with frequently changing search results as the search query is formed. Moreover, requiring the satisfaction of speculative search initiation criteria helps ensure that the search engine is not inundated with search requests. Further, performing no search until satisfaction of speculative search initiation criteria may increase the likelihood that a speculative search result will have a sufficient relevancy to warrant its return to the user. For example, a speculative search result that is based on some partially formed words may have a low relevancy. However, there are situations in which a speculative search result based on a partially formed word may be highly relevant. Techniques are provided to determine which partial search queries, whether a partial word or not, are likely to lead to a relevant speculative search result.

One technique to determine whether the not-yet-submitted search query meets criteria for initiating a search and is thus sufficiently well-formed is to time how long it has been since the user last entered a character in the search request. If the timer has expired, then a search is initiated. The period of the timer can be dynamically adjusted to adapt to the user. For example, if user types too fast, then a search may be initiated too infrequently. Alternatively, if the user types slowly, then a search may be initiated too frequently.

Another technique to determine whether the not-yet-submitted search query meets speculative search initiation criteria is to determine if a given character is included in the search query. For example, if the user enters a space character, it is likely that the user has completed a word, wherein the search query may be sufficiently well-formed to initiate a search. As used herein, a "word" may be either a word that occurs in a natural language, such as English, or a special notation, such as an abbreviation, acronym, product code, URL, etc.

Another technique to determine whether the not-yet-submitted search query is sufficiently well-formed to initiate a search is to determine if the search query matches or nearly matches a phrase in a dictionary that comprises pre-defined phrases. The pre-defined phrases may be phrases that are likely combinations of words in search requests. In one embodiment, the dictionary is based on popular queries. In one embodiment, the dictionary is used to limit the number of search queries that are performed by determining if the not-yet-submitted search query matches, or nearly matches, a term or phrase in the dictionary, as a condition for performing a search.

The determination as to whether the not-yet-submitted search query is sufficiently well-formed to initiate a search is not limited to the techniques described herein. Moreover, the determination can be made using any combination of the techniques. The determination may be made at the client node, although this is not a requirement. In one embodiment, the client node has an AJAX (Asynchronous JavaScript+ XML) engine to facilitate the determination as to whether to forward the not-yet-submitted search query to a search engine. The client node may make the determination by other techniques. In another embodiment, the determination of whether to initiate the search is made at a node other than the client, such as at the search engine.

Relevance Threshold

After the speculative search initiation criteria have been satisfied, pre-defined search rules are applied to provide the user with one or a few highly relevant speculative search results, which may be displayed on the same web page as the not-yet-submitted search query. For example, the pre-defined rules may include performing a first search that is likely to produce a highly relevant speculative search result. If the first search does not produce a speculative search result that meets a certain relevance threshold, then the user is not presented with the search results. Instead, a second search is performed. The second search is performed based on the current state of the not-yet-submitted search query, which may be different than the state of the not-yet-submitted search query upon which the first search was performed. If the results of the second search do not meet the relevance threshold, the results of the second search are not presented to the user. The process of repeatedly searching based on the not-yet-submitted search query may continue until the search query is submitted. Until the search query is submitted, the user is only presented with the results of speculative searches when those results meet the relevance threshold.

The different searches can employ different search techniques and/or may search different databases. This ordered searching, and the use of a relevancy threshold, provides the user with highly relevant results and avoids overloading the user with results, as no results need be returned to the user if the speculative search result relevancy or other criterion is deemed too low.

Example of Speculative Searches During Query Formulation

FIG. 1A, FIG. 1B, FIG. 1C, and FIG. 1D illustrate a graphical user interface 100 for providing a speculative search result, according to an embodiment of the present invention. The sequence in FIG. 1A-FIG. 1D illustrates that the speculative search result is updated with relevant search results as the user continues to further enter the search query. Techniques for determining when to initiate a new speculative search are described herein.

In FIG. 1A, the user has entered the search query 101a "sun" in the search box 102. The user has not yet entered an indication that the search query is complete. Thus, the text "sun" constitutes a not-yet-submitted search query. For example, the user has not yet clicked on the "Search the Web" button 104 or entered a carriage return to automatically trigger a search. However, the not-yet-submitted search query 101a is forwarded to a search engine, which provides a speculative search result 106a based on the not-yet-submitted search query 101a. In this case, the speculative search result 106a has a hypertext link providing a Uniform Resource Locator (URL).

The speculative search result 106a is one that is determined to have sufficient relevancy to merit providing it to the user. For example, it is undesirable to inundate the user with results having low relevancy. Embodiments of the present invention provide various techniques for determining what speculative search result has sufficient relevancy to merit returning to the user. Prior to completing the search query 101a, the user may click on the hypertext link 106a in the speculative search result 106a, if desired.

Figure 1B:
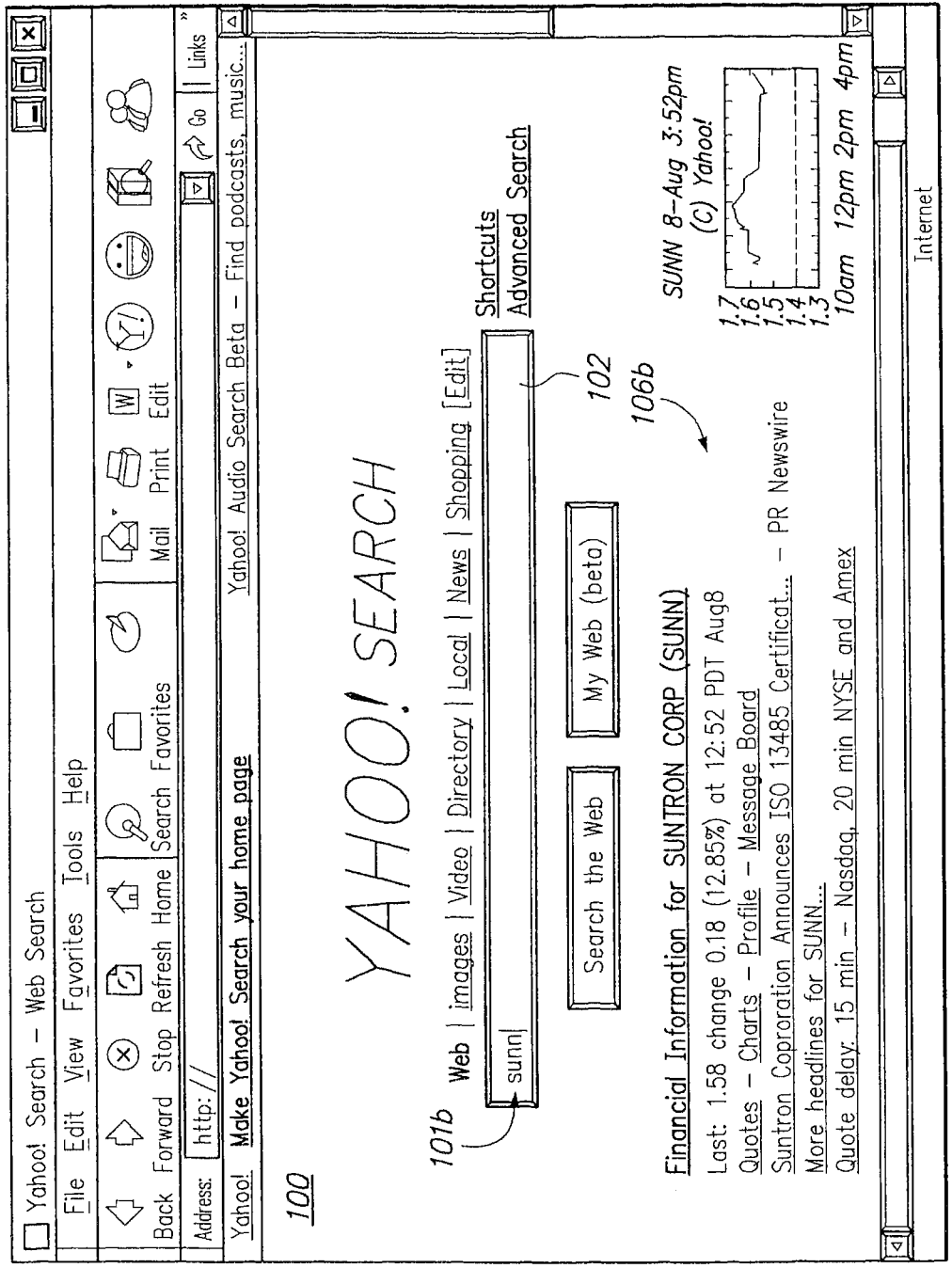

The speculative search result 106a may be updated as the user further enters the search query. FIG. 1B illustrates the graphical user interface 100 with the user having now entered a not-yet-submitted search query 101b of "sunn." A speculative search result 106b has been provided for the not-yet-submitted search query 101b "sunn." Thus, the speculative search result 106b has been updated based on the updated search query 101b. In this case, the speculative search result 106b includes an organized collection of information pertinent to a stock related to the not-yet-submitted search query 101a "sunn."

Figure 1C:
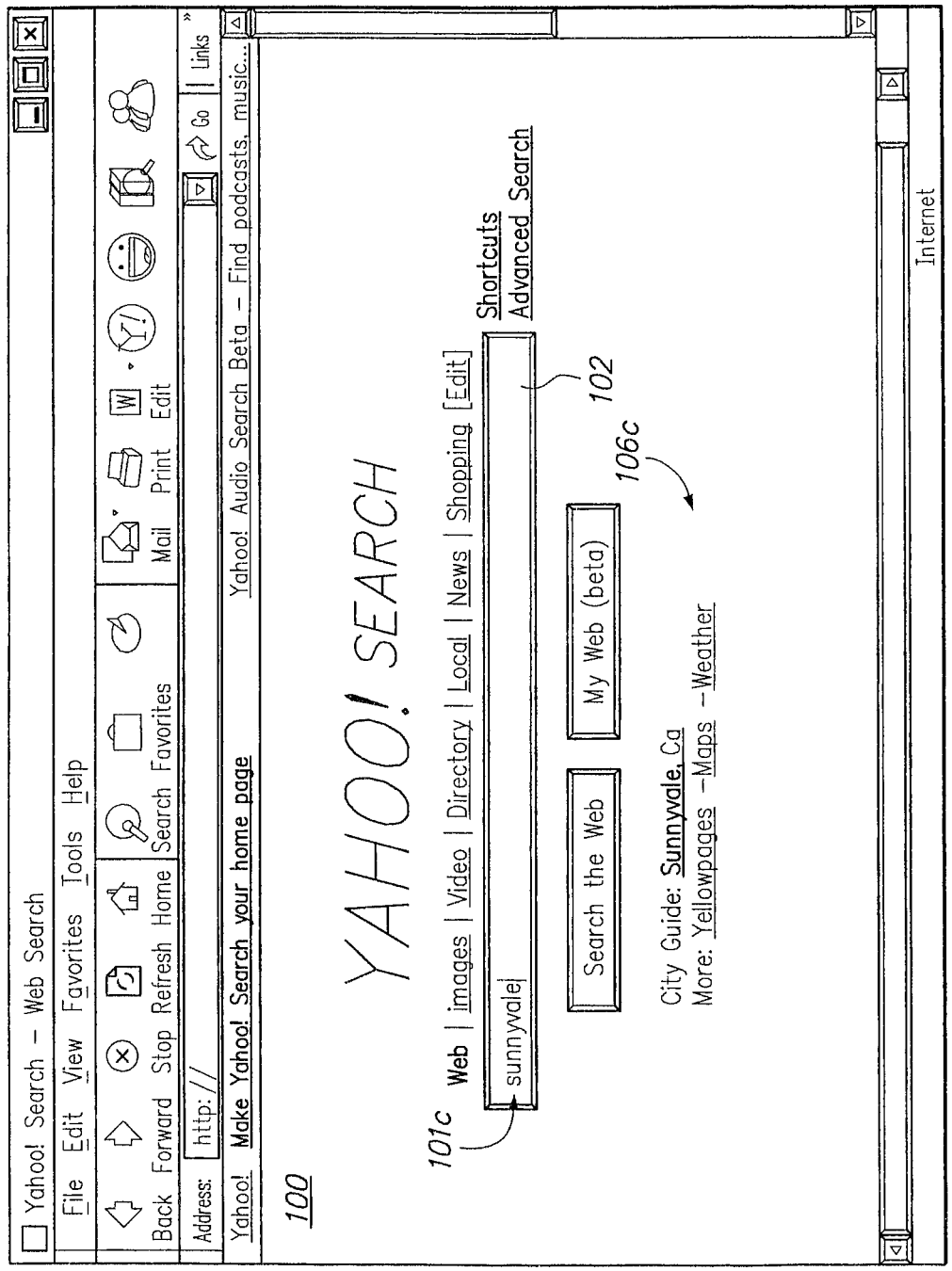

The speculative search result is not necessarily updated each time the user enters a new character in the search query 101. Referring now to FIG. 1C, the not-yet-submitted search query 101c is now "sunnyvale". Based on the text "Sunnyvale", a new speculative search result 106c is provided that is related to the city of Sunnyvale, Calif. Note that for search queries such as "sunnyv" there is not necessarily an update to the speculative search results. Thus, while it would be possible to provide a speculative search result for the term "sunnyv," embodiments of the present invention determine that such a speculative search result should not be provided to the user. Techniques for making this determination are described herein.

Figure 1D:
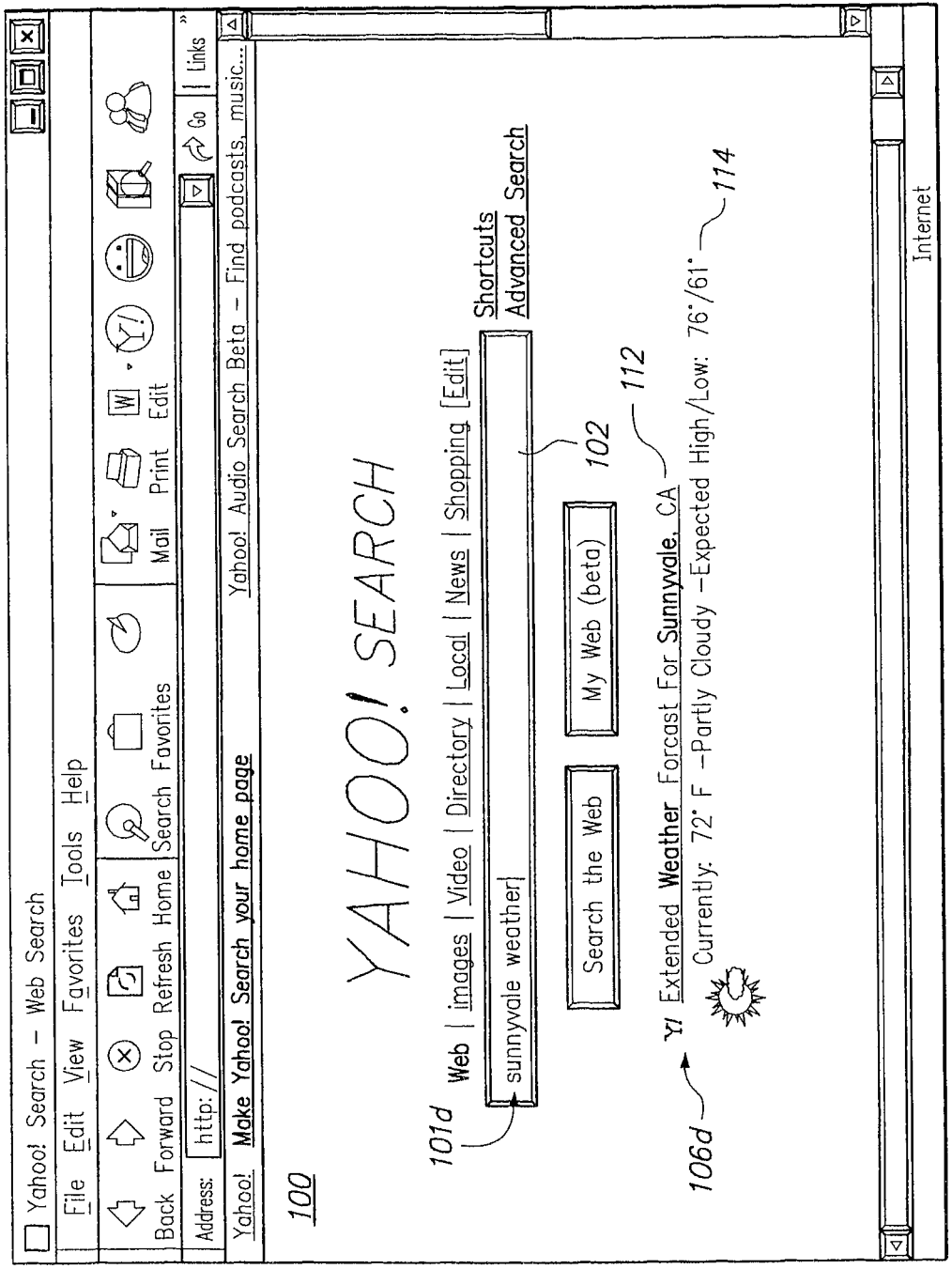

Referring now to FIG. 1D, the search query 101d is now "sunnyvale weather," wherein a new speculative search result 106d is provided that is related to weather for Sunnyvale, Calif. In this case, the speculative search result 106d includes a link 112 to a weather site, as well as an abstract 114 providing an overview of the weather for Sunnyvale, Calif.

Providing Speculative Search Results

Figure 2:
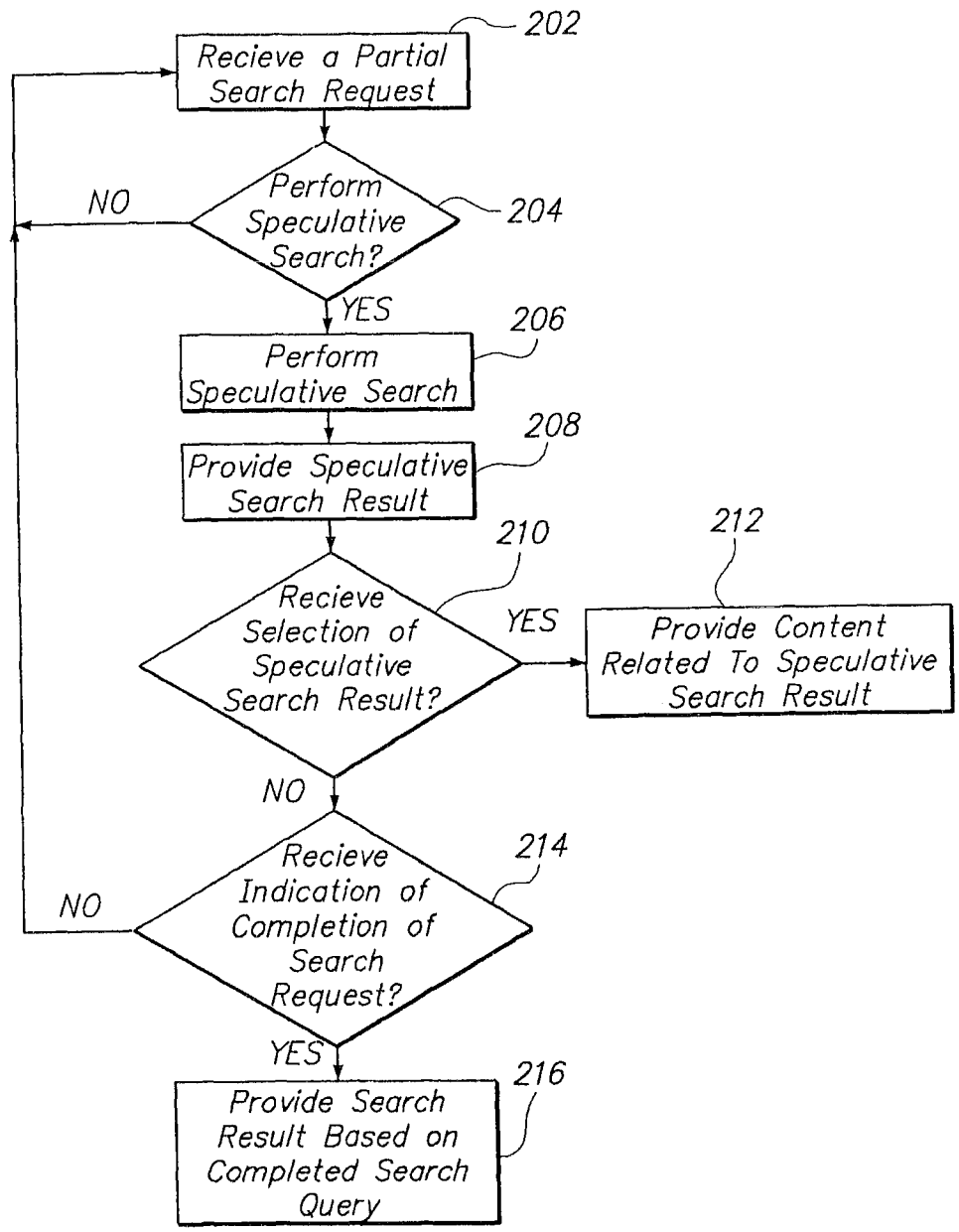
FIG. 2 is a flow diagram that illustrates a technique for providing a speculative search result for a search query, according to an embodiment of the present invention.

FIG. 2 is a flow diagram that illustrates a process 200 for providing a speculative search result to a search query, according to an embodiment of the present invention. In block 202, a not-yet-submitted search query is received. For example, an application executing on a client node receives a not-yet-submitted search query entered by a user. The not-yet-submitted search query may be forwarded to a search engine; although forwarding the not-yet-submitted search query to the search engine may take place later in process 200.

As used throughout this description, a not-yet-submitted search query means a search query for which no indication has been received, by a user interface for entering the search query, that the search request is complete. For example, when forming a search of the world wide web, or the like, a user will typically enter a carriage return or click on a "search button" to initiate the search request, thus indicating the search query is complete.

In block 204, a determination is made that the not-yet-submitted search query meets the speculative search initiation criteria. When the speculative search initiation criteria are satisfied, a search is initiated, in block 206. If the not-yet-submitted search query is not sufficiently well-formed to satisfy the speculative search initiation criteria, then the process 200 returns to block 202 to receive a further entry of the not-yet-submitted search query.

In block 206, a search is performed on the not-yet-submitted search query. The search may be performed in any convenient technique and may include several stages. An embodiment for performing the search is described in FIG. 3; however, the present invention is not limited to that technique. The search may be of any database. For example, the search is not necessarily of a database with an index based on a substantial portion of the world wide web. In one embodiment, at least a part of the search is of a database that pertains to information related to the user who is performing the search query. For example, the user's address book, calendar, etc., may be searched.

In block 208, a speculative search result is provided to the user. Exemplary speculative search results 106 are depicted in FIG. 1A-FIG. 1D, FIG. 4 and FIG. 5. The speculative search result may be displayed on the same web page on which the user is entering the search query. The speculative search result can take many different forms, including but not limited to, a link to a web page, a web page itself, a graphic (e.g., an interactive map), and a textual description. Thus, the user can view the speculative search result and determine the relevance of the speculative search result prior to indicating that the search query is complete. In a typical situation, a limited set of results are displayed to the user, so as to not overload the user with information. The search engine may forward to the client node a whole web page or only updated information for the client node to integrate into a web page currently stored on the client node. In one embodiment, the client node has an AJAX engine to facilitate the data transfer between the client and search engine, as well as to assist in rendering the updated web page.

If the user selects the speculative search result, in block 210, then content related to the speculative search result is provided, in block 212. For example, if user selects one of the links in the speculative search results 106 depicted in FIG. 1A-FIG. 1D, the user may be provided a web page related to the selected link.

If the user provides an indication that the search query is complete, then the user is provided search results that might be returned in a conventional search. Thus, if an indication that the search query is complete is received in block 214, then a complete search result is provided to the user in block 216. For example, if the user clicks on a search button (FIG. 1A, 104) or enters a carriage return, the client node forwards to the search engine a complete search query and an indication or implication that the search query is complete. Responsive to the complete search query, the search engine provides a complete search result, such as a list that may include URLs with brief descriptions of content associated with the URL. This complete search result may be provided on a separate web page from the search query web page.

The process 200 returns to block 202 if the user does not indicate that the search query is complete, wherein a further entry to the not-yet-submitted search query is received. The process 200 continues and may finish when the user selects one of the speculative search results for further information or indicates that the search query is complete.

Performing Speculative Searches

Figure 3:
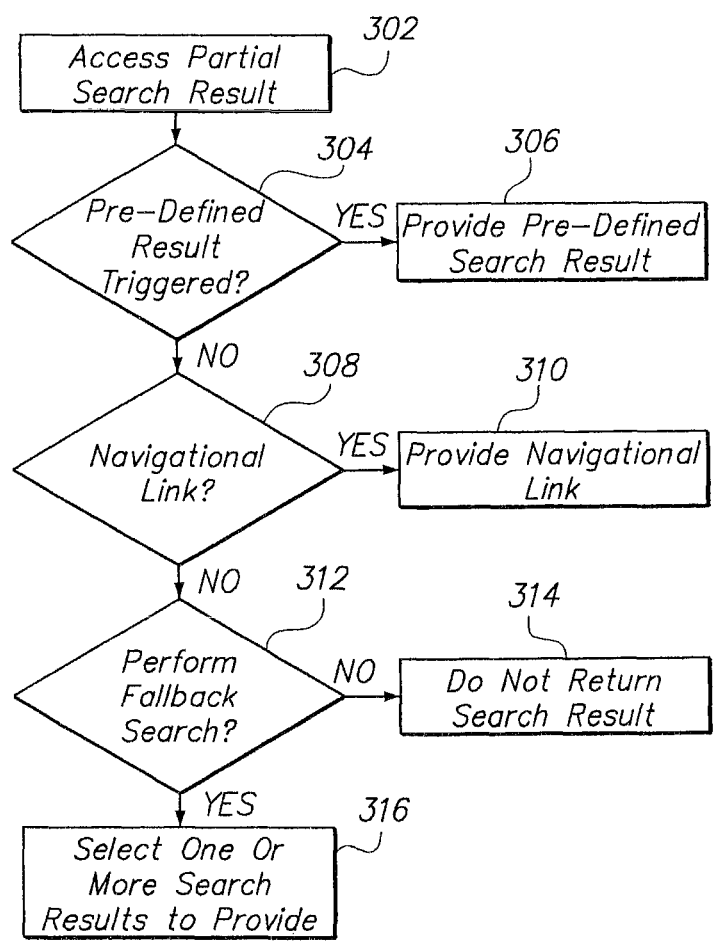
FIG. 3 is a flow diagram that illustrates a technique for determining a relevant speculative search result, according to an embodiment of the present invention.

After the decision to initiate a speculative search has been made, and before the user has explicitly initiated the search request, pre-defined search rules are applied to provide the user with one or a few highly relevant search results, which may be displayed on the same web page as the still being formed search query. FIG. 3 is a flow diagram that illustrates a process 300 for determining a relevant speculative search result to provide to the user, according to an embodiment of the present invention. This process 300 provides the user with results that are likely to be relevant and also reduces noise by filtering out search results that are expected to be less relevant. In block 302, a not-yet-submitted search query is accessed. For example, a search engine accesses the not-yet-submitted search query.

Figure 5:
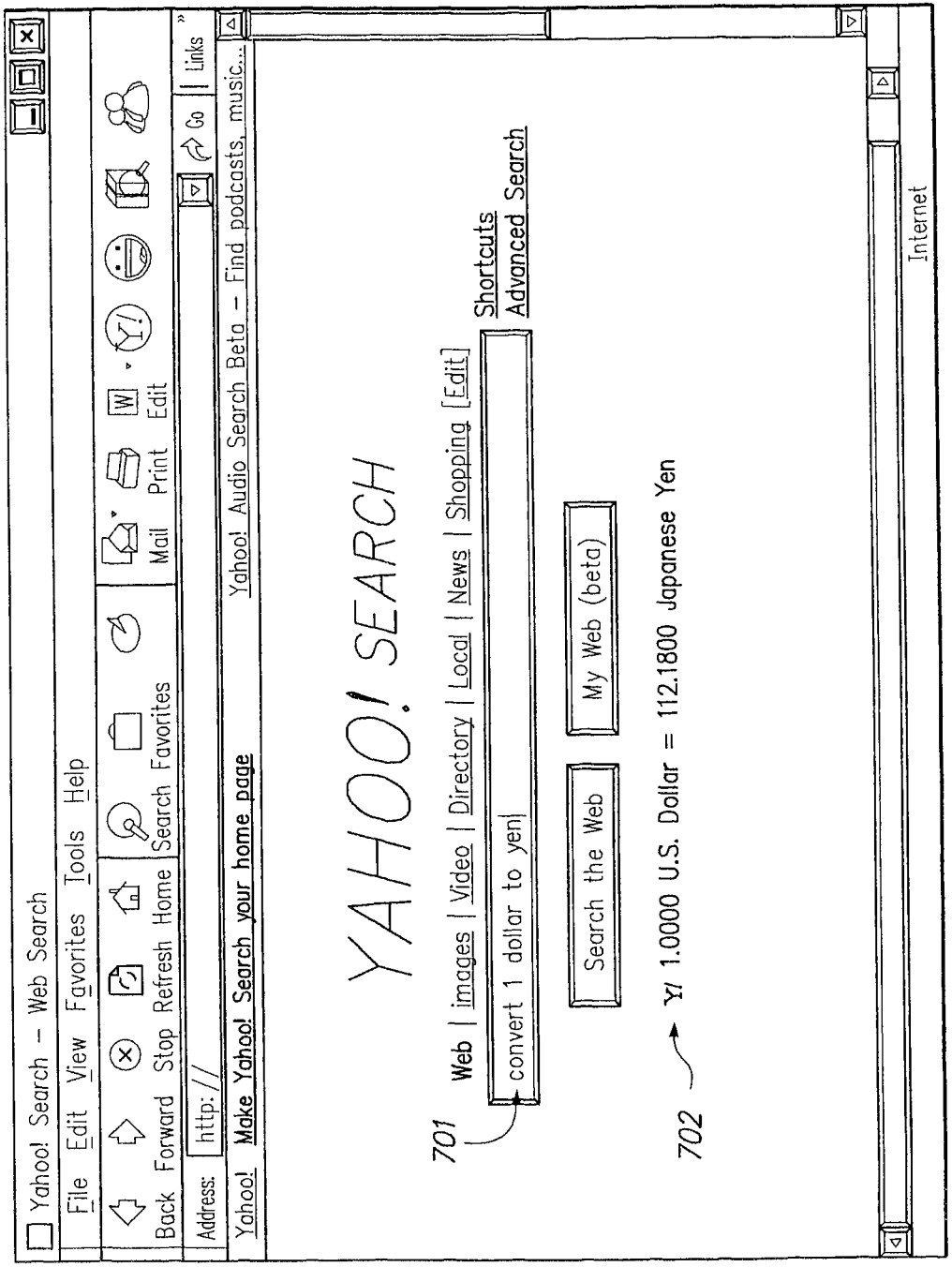

In block 304, a determination is made as to whether the search query triggers a pre-defined search result that may include an organized collection of information related to the search query. For example, based on an analysis of many searches, a set of pre-defined search results are formed that include various links related to a search query. As an example, the speculative search result for the stock depicted in FIG. 1B is an example of a search query that results in a pre-defined search result. Another example of a pre-defined search result is depicted in FIG. 5, in which a search result that converts from dollars to yen is provided in response to the search query "convert 1 dollar to yen."

If the search query matches (or nearly matches) a pre-defined search result in block 304, then the pre-defined search result is provided in block 306. For example, a web server transfers the pre-defined search result to the client node, wherein an application executing on the client node is able to display the result on the same web page as the search query being formed.

In block 308, the not-yet-submitted search query is analyzed to determine if it may be a search query to obtain a navigational link, such as a URL. For example, many users employ a search query to obtain a URL if the user is not certain of the URL. By analyzing the not-yet-submitted search query, a determination can be made if the search query appears to be an attempt to locate a URL. In some cases, the user may type a search query that would be expected to logically relate to a URL; however, the actual URL is different than would be expected. Built in intelligence can correct such a situation, such that the user is provided with a URL to a highly relevant web site.

If the determination in block 308 is that the search query may be for a navigational link, then the navigational link is provided to the user in block 310. For example, the search engine forwards the web link to the client node, wherein an application executing on the client node displays the navigational link on the same web page as the search query.

If the not-yet-submitted search query does not trigger either a pre-defined search result or a navigational link, then a determination is made as to whether to provide a fallback search result to the user, in block 312. The relevancy of a potential fallback result can be assessed prior to providing it to the user, such that the user is not inundated with results having low relevancy. In one embodiment of the present invention, a dictionary is used to filter the search query prior to performing the fallback search. Thus, if the search query does not match, or nearly match, a term or phrase in the dictionary, the process 200 goes to block 314 in which a fallback search is not performed. In one embodiment, the phrases in the dictionary are learned from a statistical analysis of searches.

If test of block 312 determines that a fallback search should be performed, then one or more fallback search results are selected for providing to the user, in block 316. The fallback search results may include a title of a web page, one or more abstracts of a page, and a Uniform Resource Locator (URL) of a page. The fallback result can provide a single result (or limited number of results) of a web search or partial web search. Moreover, the scope of the search can be adjusted to impact the expected relevancy of search results. Fallback search results are described in greater detail hereafter.

Fallback Search Results

Rather than provide uncommon search results, which may have a low relevancy, the fallback search can be confined to a set of common search results. For example, the results of the top 50,000 searches are tracked, wherein a fallback search result is only provided if the not-yet-submitted search query triggers one of the popular search results. Any convenient number of popular search results may be used. Thus, embodiments of the present invention avoid providing the user with a non-relevant search result just because a search based on a not-yet-submitted search query triggers an obscure web page. The fallback search results can be based on any set of user searches ranging from everyone who uses the search engine to only the user who is forming the current search query.

In order to simplify the user experience, a limited number of fallback results are shown on the search query page. For example, only a single result may be provided to the user in one embodiment. Typically, results of searchers are accorded a relevancy. In one embodiment, the search result with the highest relevancy is provided. Alternatively, a few results can be provided based on an analysis of the relevancy. In one embodiment, the search result is only provided if its relevancy exceeds a threshold. Multiple results can be provided if the spread in relevancy between top results is close. The threshold can be dynamic. An abstract can be shown with the result to help guide the user as to its relevancy.

Relevancy may be determined by a variety of techniques. For example, a page's relevance score may be based on how many words, from the search query, are contained in the page, and/or how frequently those words occur in the page. A page's relevance score may also take into account some "page quality metrics" like a citation index, the authoritativeness of the page source, etc. A page's relevance may also be defined relative to the user who submitted the query. For example, relevance may be based on the language used to submit the query (e.g., English or French). For another example, relevance may be based on properties of the user (e.g., the user's geographic region, gender, or social group). Thus, relevance scores for pages that result from query submitted by a user in the United Kingdom may be determined differently than relevance scores for pages that result from the same query submitted by a user in the United States.

Suggestions to Improve Search Query

In order to improve the quality of a search query, an embodiment of the present invention suggests an alternative spelling to a search query that is being formed prior to the user indicating that the search query is complete. For example, the user may enter a preliminary search query that is determined to have a possible spelling error. The user is prompted with an alternative spelling suggestion in accordance with an embodiment of the present invention. Moreover, the spelling suggestion is provided prior to the user indicating that the search query is complete. The user may click on a provided link associated with the spelling suggestion to cause the spelling in the search box to be automatically corrected. Further, responsive to the user clicking the link associated with the suggested spelling, a navigational link may be provided as a speculative search result.

In another embodiment, the user is prompted to try another search query based on an analysis of the not-yet-submitted search query. The suggested alternative search query is provided responsive to the not-yet-submitted search query, while the user is still entering the search query.

In one embodiment, a history of a user's search requests is tracked and used to determine a relevant search result. For example, if the user frequently accesses a certain weather report, a link may be automatically provided upon the user typing in the beginning of the search query.

One type of speculation to enhance the user experience is to speculate as to what the not-yet-submitted search query will turn out to be and proactively search based on the speculated complete search query. For example, a database can be indexed with the partially formed search query to speculate as to what the complete search query might be. Alternatively, information that is user specific such as an address or phone book can be searched with the partially formed search query to speculate as to what the complete search query might be. For example, if the phrase, "john telep" is entered by the user as a not-yet-submitted search query, the user's telephone/address book can be searched to find the telephone number of anyone named John. The telephone number is provided to the user responsive to the not-yet-submitted search query. Other user databases could be searched as well, such as e-mail, note pad, favorite places, history, etc.

Exemplary Search Results

Figure 4:
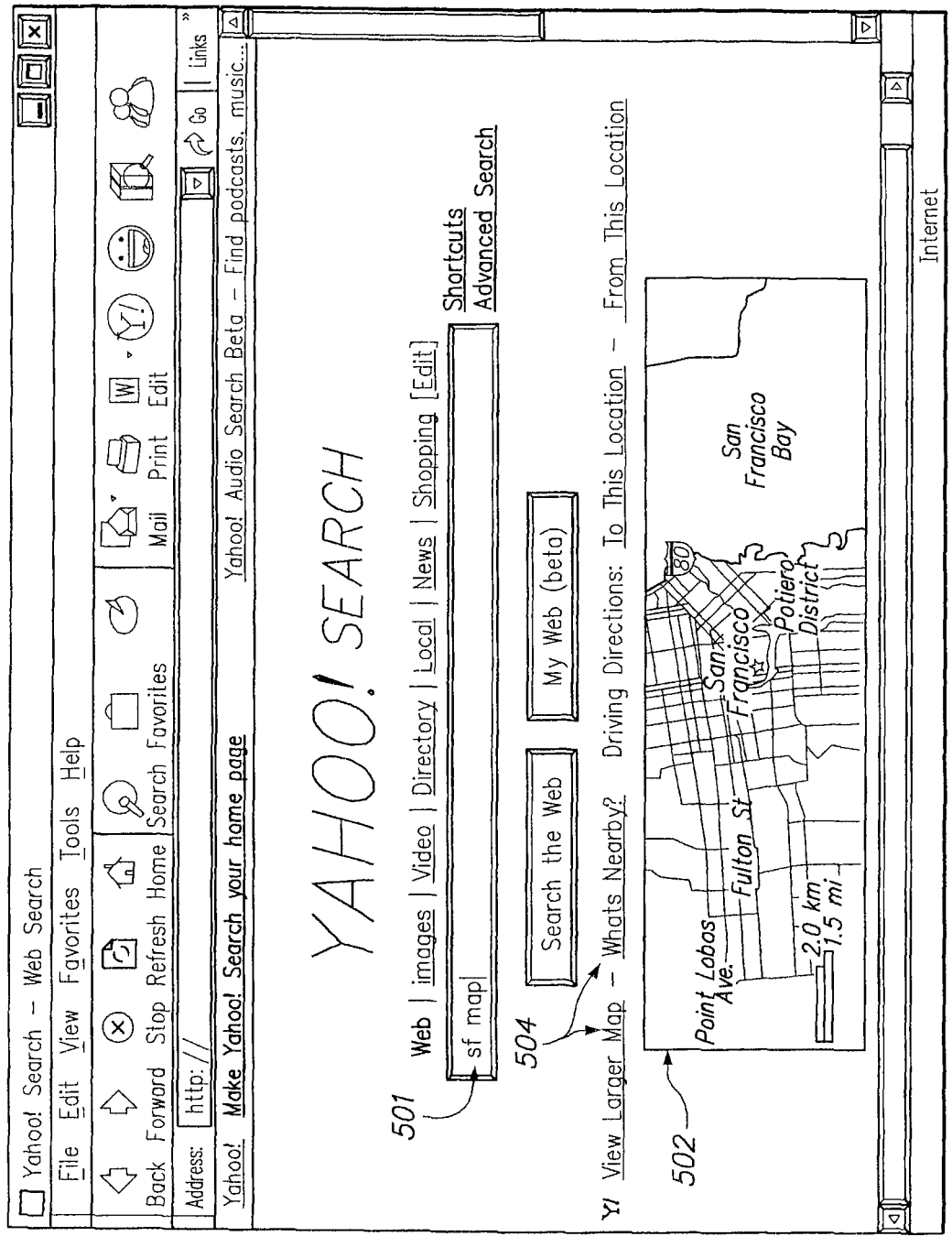
FIG. 4 and FIG. 5 illustrate various types of speculative search results that are provided by embodiments of the present invention.

Embodiments of the present invention analyze the search query for keywords to determine what type of a search to perform. For example, FIG. 4 illustrates an example in which the user has entered a search 501 of "sf map," wherein a map 502 of San Francisco is provided while the user is typing in the search query 502. Moreover, other helpful links 504 are provided in the speculative search result.

Hardware Overview

Figure 6:
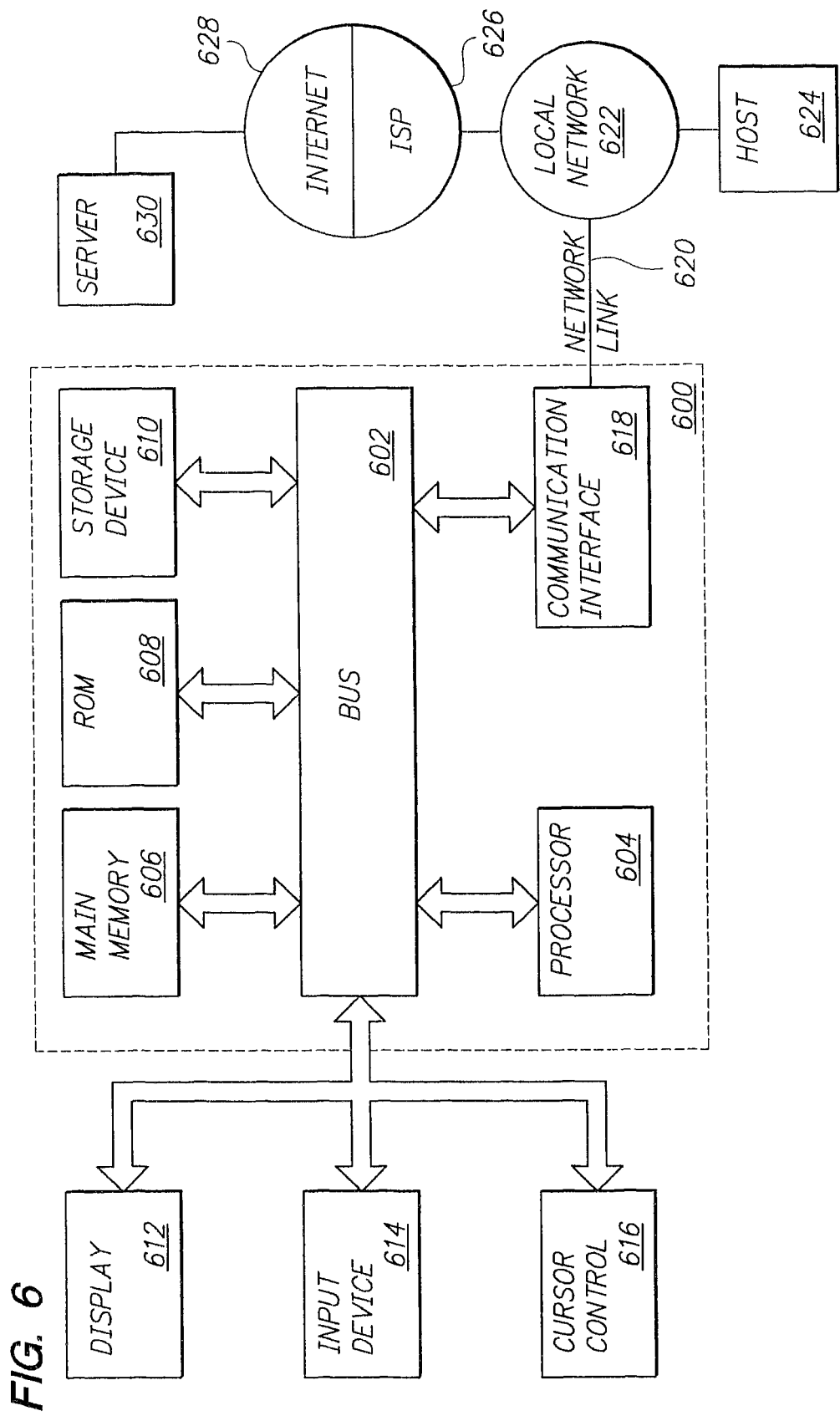
FIG. 6 is a block diagram that illustrates a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may be used to implement the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
displaying, at a client device, a web page that includes a search box for entering characters and a search results area for displaying search results;
receiving, at the client device, through the search box, a not-yet-submitted search query;
determining, at the client device, whether the not-yet-submitted search query meets a speculative search initiation criterion;
in response to determining that the not-yet-submitted search query meets the speculative search initiation criterion, transmitting the not-yet-submitted search query from the client device to a search engine prior to receiving an indication that a user has submitted the not-yet-submitted search query;
receiving, from the search engine, at the client device, prior to receiving the indication that the user has submitted the not-yet-submitted search query, one or more speculative search results based on the not-yet-submitted search query; and
updating the search results area, prior to receiving the indication that the user has submitted the not-yet-submitted search query, with the one or more speculative search results including at least one of a hypertext link and a uniform resource locator.

2. The method of claim 1, wherein:
determining whether the not-yet-submitted search query meets the speculative search initiation criterion employs an Asynchronous JavaScript and XML (AJAX) engine at the client device; and
updating the search results area comprises the AJAX engine rendering the web page based on the one or more speculative search results.

3. The method of claim 1, wherein after transmitting the not-yet-submitted search query and prior to updating the search results area, the search results area does not include any search results.

4. The method of claim 1, wherein one of the one or more speculative search results include a graphic or a portion of a webpage.

5. The method of claim 1, wherein the one or more speculative search results include a map of a geographical area.

6. The method of claim 1, wherein the one or more search results include a currency conversion between a first currency and a second currency that is different than the first currency.

7. The method of claim 1, wherein the one or more search results include weather data that indicates current weather information for a geographical area.

8. The method of claim 1, wherein the one or more speculative search results include a stock price.

9. A method comprising:
storing a set of fallback search results that are based on a plurality of search queries and that have been provided to a plurality of client nodes;
receiving, from a client node, a not-yet-submitted search query that the client node has determined meets a speculative search initiation criterion;
determining, prior to receiving an indication that a user has submitted the not-yet-submitted search query, whether the not-yet-submitted search query is likely for obtaining a navigation link;
in response to determining that the not-yet-submitted search query is not likely for obtaining a navigation link, prior to receiving the indication that the user has submitted the not-yet-submitted search query, determining whether to provide one or more search results from the set of fallback search results to the client node;
in response to determining to provide one or more search results from the set of fallback search results, prior to receiving the indication that the user has submitted the not-yet-submitted search query, based on the not-yet-submitted search query, selecting one or more fallback search results from the set of fallback search results; and
transmitting the one or more fallback search results including at least one of a hypertext link and a uniform resource locator to the client node prior to receiving the indication that the user has submitted the not-yet-submitted search query;
wherein the method is performed by one or more computing devices.

10. The method of claim 9, wherein:
selecting one or more fallback search results comprises identifying, based on the not-yet-submitted search query, a map of a geographical location; and
transmitting the one or more fallback search results to the client node comprises providing the map to the client node.

11. The method of claim 9, wherein:
selecting one or more fallback search results comprises identifying, based on the not-yet-submitted search query, currency conversion data; and
transmitting the one or more fallback search results to the client node comprises providing the currency conversion data to the client node.

12. The method of claim 9, wherein:
selecting one or more fallback search results comprises identifying, based on the not-yet-submitted search query, current weather data; and
transmitting the one or more fallback search results to the client node comprises providing the current weather data to the client node.

13. The method of claim 9, wherein transmitting the one or more fallback search results to the client node comprises transmitting the one or more fallback search results to the client node without sending a web page to the client node.

14. The method of claim 9, wherein transmitting the one or more fallback search results to the client node comprises transmitting the one or more fallback search results to an Asynchronous JavaScript and XML (AJAX) engine executing on the client node.

15. The method of claim 9, further comprising:
  determining, prior to receiving the indication that the user has submitted the not-yet-submitted search query, whether the not-yet-submitted search query triggers a pre-defined search result;
  wherein determining whether to provide one or more search results from the set of fallback search results to the client node is also performed in response to determining that the not-yet-submitted search query does not trigger a pre-defined search result.

16. The method of claim 9, wherein:
  selecting the one or more fallback search results from the set of fallback search results comprises:
    determining a relevancy of each fallback search result of the one or more fallback search results, and
    determining whether the relevancy of said each fallback search result exceeds a threshold; and
  transmitting the one or more fallback search results to the client node is performed only after determining that the relevancy of said each fallback search result exceeds the threshold.

17. The method of claim 15, wherein the threshold is a first threshold, the not-yet-submitted search query is a first not-yet-submitted search query, and the client node is a first client node, the method further comprising:
  automatically modifying the first threshold to be a second threshold that is different than the first threshold;
  receiving, from a second client node, a second not-yet-submitted search query that is different than the first not-yet-submitted search query; and
  prior to receiving an indication from said second client node that said second not-yet-submitted search query is completely formed:
    determining whether the second not-yet-submitted search query is likely for obtaining a navigation link;
    in response to determining that the second not-yet-submitted search query is not to obtain a navigation link, determining whether to provide search results from the set of fallback search results;
    in response to determining to provide search results from the set of fallback search results:
      determining a relevancy of each second fallback search result of one or more second fallback search results;
      determining whether the relevancy of said each second fallback search result exceeds the second threshold; and
      selecting the one or more second fallback search results from the set of fallback search results based on the relevancy of said each second fallback result; and
    transmitting the one or more second fallback search results to said second client node.

18. The method of claim 9, further comprising:
  storing search data that identifies a set of popular search queries that are classified as most popular;
  determining one or more search results for each search query in the set of popular search queries; and
  storing, in the set of fallback search results, only search results that are determined from one of the search queries in the set of popular search queries.

19. The method of claim 9, further comprising:
  receiving, from a second client node, a second not-yet-submitted search query comprising at least a character;
  prior to receiving an indication from the second client node that the second not-yet-submitted search query is completely formed:
  identifying a first set of search results based on the second not-yet-submitted search query;
  determining whether the first set of search results satisfy a relevance threshold;
  in response to determining that the first set of search results does not satisfy the relevance threshold, waiting for additional input from the second client node without providing the first set of search results to the second client node;
  receiving, from the second client node, an updated second not-yet-submitted search query that comprises the second not-yet-submitted search query and one or more additional characters;
  in response to receiving the updated second not-yet-submitted search query, identifying a second set of search results based on the updated second not-yet-submitted search query;
  determining whether the second set of search results satisfy the relevance threshold; and
  in response to determining that the second set of search results satisfy the relevance threshold, providing, to said second client node, information about at least one item in the second search results.

* * * * *